United States Patent [19]  
Johnsen

[11] 4,125,349  
[45] Nov. 14, 1978

[54] CLAY EXTRUSION APPARATUS

[76] Inventor: Albert Johnsen, 482 Swanton Rd., Davenport, Calif. 95017

[21] Appl. No.: 804,569

[22] Filed: Jun. 8, 1977

[51] Int. Cl.² ............................................. B29D 23/04
[52] U.S. Cl. ................................ 425/192 R; 425/380; 425/458; 425/467; 425/468
[58] Field of Search ............ 72/264, 269; 264/176 R, 264/209; 425/190, 192 R, 458, 87, 380, 467, 468, 191

[56] References Cited

U.S. PATENT DOCUMENTS

| 1,500,754 | 7/1924 | Howard et al. | 425/467 |
| 1,999,926 | 4/1935 | Garzia | 425/380 |

FOREIGN PATENT DOCUMENTS

| 590,844 | 1/1934 | Fed. Rep. of Germany | 425/467 |
| 646,458 | 6/1937 | Fed. Rep. of Germany | 425/467 |

Primary Examiner—J. Howard Flint, Jr.  
Assistant Examiner—Mark Rosenbaum  
Attorney, Agent, or Firm—Julian Caplan

[57] ABSTRACT

A clay extrusion apparatus has a cylinder open at the top for a rod which depresses the piston. At the bottom of the cylinder is an outer die held in place by a cap bolted to the cylinder. Within the opening of the outer die is an inner die supported by a stem extending up into the cylinder and attached at its upper end to a spider-like bracket which fits centrally within the cylinder and the lower ends of the legs of which are supported by the outer die. The inner and outer dies are changeable to form different outside and inside shapes of hollow clay extrusions. The inner die and its support may be removed to produce solid shapes.

2 Claims, 6 Drawing Figures

CLAY EXTRUSION APPARATUS

This invention relates to a new and improved clay extruder for use by potters to make handles, foot rims, kilns, furniture, tubes, mirror frames, and the like, and even pots without the use of a wheel.

The device hereinafter described may be used to produce a variety of different shapes depending on the selection of changeable inner and outer dies. The device may be used to make solid shapes or hollow tubes. The outside shape of the solid shapes or tubes is subject to wide variation. Where hollow tubes are formed, the inside shape is also subject to wide variation. Beads may be formed by removing the inner die and supporting from the inner die support a rod.

A particular advantage of the invention is the versatility of the device and wide variety of shapes which may be formed. The dies are readily and easily changed.

Another feature of the invention is the means whereby the inner die is supported in such fashion as not to interfere with the shapes of the inner and outer surfaces of the extrusion.

Another feature of the invention is the fact that it is rugged and yet of inexpensive construction.

Other objects of the present invention will become apparent upon reading the following specification and referring to the accompanying drawings in which similar characters of reference represent corresponding parts in each of the several views.

Figure 1:
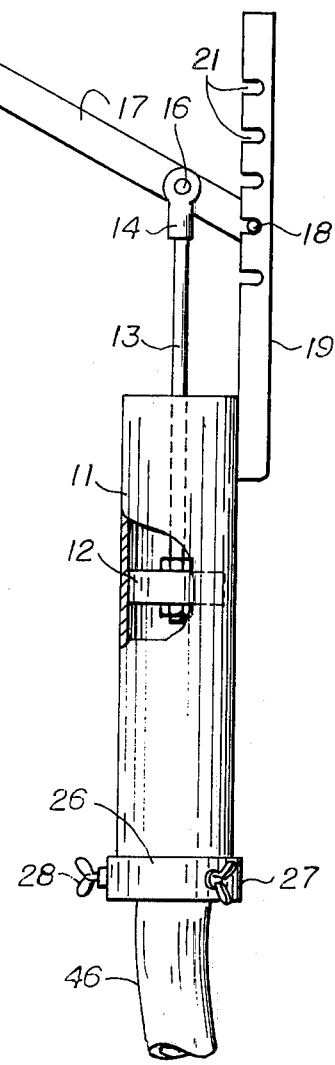
FIG. 1 is a side elevational view showing the device in a position of use and partially broken away to reveal internal construction.

The device of the present invention is an adaptation of a commercially available extruder and employs a cylinder 11 in which reciprocates a piston 12 on the lower end of a piston rod 13, the upper end of which carries a clevis 14 pivoted by pin 16 to an arm or handle 17. The inner end of arm 17 carries outward projecting pins 18 which fit into a pre-selected notch 21 of bar 19 which is fixed to the upper end of cylinder 11. Bar 19 may be mounted on the wall or other convenient locations. It has a plurality of longitudinally spaced notches 21. The pins 18 may be installed in any of these notches depending upon the quantity of clay which is within the cylinder 11 below the piston 12. By pressing down on the handle or arm 17 and using the pins 18 and notch 21 as fulcrum, the clay is extruded through the bottom of the tube 11.

Figure 2:
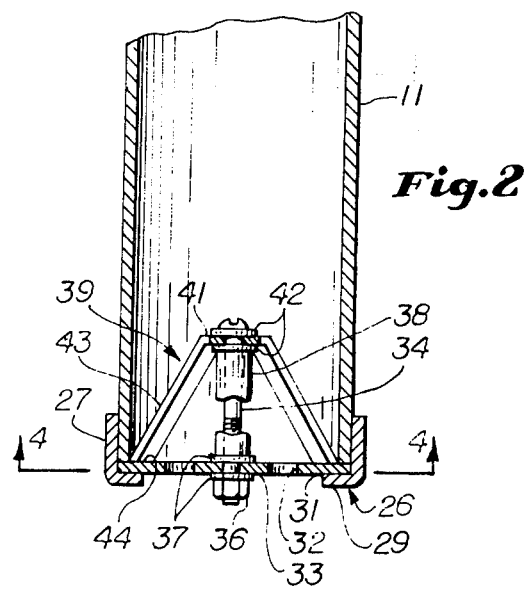
FIG. 2 is a fragmentary, vertical, sectional view through the device.
Figure 3:
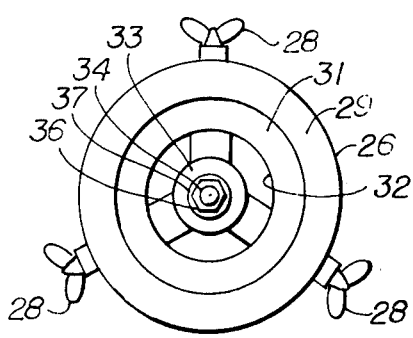
FIG. 3 is a bottom plan view of the structure of FIG. 2.

Directing attention particularly to FIG. 2, the bottom of cylinder 11 is open. Fixed to the lower end of cylinder 11 is a lower cap 26 which is L-shaped in cross-section, having a peripheral flange 27 secured to cylinder 11 by thumb screws 28 and also having narrow annular rim 29.

Between the lower edge of cylinder 11 and the rim 29 is one of a variety of outer dies 31, the apertures 32 of which are subject to wide variation.

When tubes are to be formed, inner die 33 is used, the exterior shape of die 33 also being subject to wide variation. Inner die 33 is centrally apertured and through the aperture fits bolt 34, on the lower end of which is threaded nut 36 with washers 37 on opposite sides of die 33. Bolt 34 is supported by spider 39 which has an apertured top 41 through which the bolt 34 extends with washers 42 on the upper and lower surfaces of top 41. Below the lower washer 42 is a spacer sleeve 38 fitting over the bolt 34 and interposed between the lower washer 42 and upper washer 37. Spider 39 has a plurality of outwardly-downwardly slanted legs 43 (here shown as 3 in number), and the lower ends 34 of legs 43 fit inside the lower end of cylinder 11 and rest on outer die 31. As the clay is extruded, it passes around the legs 43 which do not affect the final shape of the work 46. The outer shape of work 46 is dependent upon the choice of the outer die 31, and more particularly, the aperture 32 thereof. The shape of the inside of the work 46 is dependent upon the shape of the inner die 33.

Figure 4:
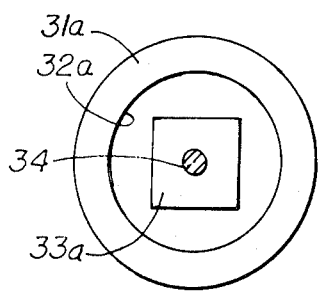
FIGS. 4, 5 and 6 are schematic views showing different inner and outer die shapes.
Figure 5:
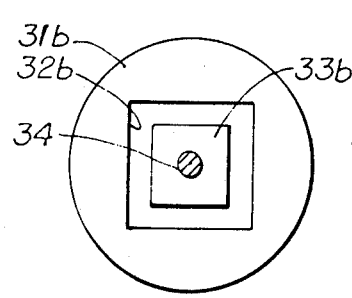
Figure 6:
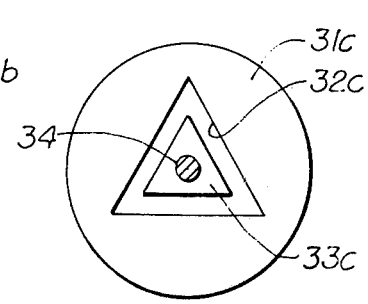

FIGS. 4 through 6 show different dies 31a to 31c, having different apertures 42a to 42c, respectively, and also having inner dies 33a to 33c, respectively, supported on bolt 34. These views are shown along the line 4—3 of FIG. 2.

If a solid shape is to be extruded, the die 33 and its supporting spider 39 are removed. If a bead is to be formed, the die 33 is removed as well as the lower washer 37, spacer sleeve 38 and the lower most of the washers 42. The nut 36 is turned until it is tight against the top 41 of the spider 39. Thus the bolt 34 forms the hole in the bead. Choice of different size bolts 34 determines the hole size of the beads.

The dies are readily interchanged by loosening the wing nuts 28 to replace the outer die 31. The inner die 33 is changed by removing the bolt 36.

It will thus be seen that a wide variety of products may be extruded depending upon the choice of the user. The selection of an outer die 31 as well as inner die 33 is subject to wide variation; and by using different combinations, a wide variety of tubes 46 may be produced. The removal of inner die 33 permits a wide variety of outer solid extrusions and, as has been explained, beads may also be formed. After the dies have been selected and installed, as shown in FIG. 2, the piston 12 is removed by removing the pins 18 from notches 21 and lifting the arm 17. Clay is placed inside the cylinder 11, the piston 12 is reinserted through the top of the cylinder 11 and the pins 18 inserted in the appropriated notch 21, depending upon the quantity of clay inside the cylinder 11. The arm 12 is depressed causing the cylinder 12 to be depressed and forcing the clay out through the gap between the aperture 32 and the die 33.

What is claimed is:

1. An extrusion apparatus comprising, a cylindrical casing having an inner wall, a piston, means operatively associated with said piston for reciprocating said piston within said casing, said piston engaging said inner wall, said casing having a discharge end, an outer die fitting against said discharge end of said casing, said outer die having an opening, a ring around the outside of said casing having a thin annular flange below said outer die and fitting against the periphery of said outer die to detachably secure said outer die against said discharge end of said casing, means detachably securing said ring to said casing, an inner die of lesser size than said opening, and support means supporting said inner die within said opening disposed centrally of said opening, said support means comprising a top, a plurality of spider-like legs extending outward from said top, the distal ends of said legs resting on said outer die, the distal ends of said legs engaging said inner wall of said casing, an elongated threaded member depending from said top, fastening means for detachably securing said inner die to the distal end of said threaded member, and a sleeve around said threaded member engaging said inner die, said fastening means comprising a nut on said threaded member below said inner die.

2. Apparatus according to claim 1 in which said outer die is a change part and said inner die is a change part.

* * * * *